United States Patent [19]

Bechthold et al.

[11] 4,305,748

[45] Dec. 15, 1981

[54] PROCESS FOR PELLETIZING OR GRANULATING AMMONIUM SULFATE

[75] Inventors: Horst Bechthold, Erftstadt-Friesheim; Ulrich Mohn, Bergisch-Gladbach, both of Fed. Rep. of Germany

[73] Assignee: Maschinenfabrik Buckau R. Wolf AG, Grevenbroich, Fed. Rep. of Germany

[21] Appl. No.: 120,073

[22] Filed: Feb. 7, 1980

[30] Foreign Application Priority Data

Feb. 15, 1979 [DE] Fed. Rep. of Germany ....... 2905731

[51] Int. Cl.³ ............................................... C05C 3/00
[52] U.S. Cl. ......................................... 71/61; 71/63; 71/64.6; 23/313 P; 159/48 R
[58] Field of Search ................. 71/1, 64 DA, 64 DB, 71/61, 63; 423/266, 545; 23/302 A, 313 R, 313 P; 159/48 R

[56] References Cited

U.S. PATENT DOCUMENTS 2,631,084  3/1953  Robinson ........................... 71/63 X
3,539,329  11/1970 Wilson ............................... 71/63 X
3,725,029  4/1973  Blackmore ...................... 423/545 X

*Primary Examiner*—S. Leon Bashore
*Assistant Examiner*—Ferris H. Lander
*Attorney, Agent, or Firm*—Michael J. Striker

[57] ABSTRACT

Ammonium sulfate in dissolved form is dried in a gas current to obtain the ammonium sulfate in finely divided form. Thereafter the ammonium sulfate is quickly placed into a pelletizing device, subjected to a fine water spray, pelletized to substantially uniform grain size, and dried if necessary and/or desired.

5 Claims, No Drawings

PROCESS FOR PELLETIZING OR GRANULATING AMMONIUM SULFATE

BACKGROUND OF THE INVENTION

The invention relates to a process for pelletizing or granulating ammonium sulfate.

Synthetic fertilizers are usually sold in grain sizes of pellets which are as uniform as possible. It is, however, desirable for modern fertilizers to intermix different fertilizer components in order that the fertilizer mixture can thus be applied to the land. This type of mixed fertilizer is being supplied in most cases directly from the manufacturer. This notwithstanding, it is desirable during the manufacturing process to make the individual components of such fertilizer mixture separately in order to permit later to mix them in any desired ratio.

During shipment, however, there arise problems with this kind of mixture since the different components of the mixed fertilizer have a tendency, due to their physical properties, to separate out during shipping when they are exposed to shaking or vibration.

The main reason for these separations is the grain size. However, the grain shape is also important. It can therefore happen that a load of mixed fertilizers arrives at the final user, largely in separate components. A uniform distribution of the fertilizer is then no longer possible.

These problems appear particularly if not only the grain size, but also the grain shape varies. Ammonium sulfate normally is supplied in crystallized condition. These crystals, in addition, are in most cases considerably smaller than the normal commercial grain sizes of pelletized fertilizers.

The mixture of ammonium sulfate with other fertilizer components presents, therefore, a difficult problem.

It is on the other hand also known that ammonium sulfate does crystallize only with certain difficulties and the manufacture of large crystals which would be desirable according to the above discussion is therefore rather costly. Besides, if it were possible even to make large ammonium sulfate crystals they still would have a considerably different shape when compared with pelletized fertilizers. Therefore, the danger of separation still exists.

Experiments to convert crystallized ammonium sulfate into pellets have heretofore not had any commerically useful result.

In a prior art fuel-gas desulfurization process (West German published application No. 25 18 386) a spray dried ammonium sulfate is obtained during the process in the form of a fine powder which separates out in an electrofilter and is obtained therefrom. This product was, however, not suited for use in fertilizers in the dust form in which it was obtained since then similar problems occurred as above described.

It is, therefore, an object of the present invention to convert this type of dust-like product into a fertilizer or fertilizer component which can be obtained with normal chemical appliances and procedures.

SUMMARY OF THE INVENTION

The invention solves the problems described by drying dissolved ammonium sulfate at as short a resident time as possible and subsequently and without any intermediate time delay, placing the ammonium sulfate in a pelletizing or granulating device while adding thereto a fine spray of water whereby a product of desired grain size is obtained which is thereafter subjected to drying.

The drying is carried out by spray drying and in this manner it is possible, in spite of the above discussed difficulties, to convert the dried ammonium sulfate into pellets or into a granulate. The amount of water used in a fine spray in this case was 6 to 8% by weight relative to the dry material. The water was sprayed onto the material while it was on the pelletizing tray and the tray was then further handled as is normal in a pelletizing device. Surprisingly, with this type of process there were formed highly uniform almost spherical granulates which exhibited a substantial strength already while still in wet condition. A subsequent final drying of the pellets resulted in a product which was perfectly suited for distribution with the usual fertilizer distributing means. The thus obtained fertilizer is sufficiently abrasion resistant and if the pelletizing process is carried out in the suitable manner, it can also be obtained in different but highly uniform grain sizes.

The reason for this surprising effect was at first not at all obvious. Only additional experiments in which a product was subjected to pelletizing which had originated in previous operating periods was it possible to find an explanation for the novel effects. It was found that the product which had been in storage for a more extended period of time was not only very difficult in pelletizing, but the strength of the thus produced pellets was substantially lower than the strength of pellets formed from freshly made product. Further investigation of the initial material then showed a clear crystal enlargement in the product which had undergone storage. Thus, it was found that crystalline ammonium sulfate is very difficult to pelletize. This is explained by the fact that smooth large surface crystals have presumably a lower cohesion than more or less spherical porous agglomerates which are composed only of microcrystals as they normally are produced during spray drying. During the experiments for making pellets a further effect was observed in regard to the drying process. In order to obtain as low a residual moisture content as possible the pellets were occasionally subjected to a thermal treatment far above the time actually necessary to carry out the drying of the product. Surprisingly, it was found that an increasing strength of the produced pellets was obtained depending on the duration of the thermal aftertreatment.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Process for producing ammonium sulfate granulates, in which ammonium sulfate upon addition of a finely sprayed aqueous medium is granulated and then dried, comprising spray drying dissolved ammonium sulfate and then without time delay granulating with water the thereby obtained finely divided ammonium sulfate.

2. The process of claim 1, wherein the dried granular product is subjected to a further thermal aftertreatment.

3. The process of claim 2, wherein the aftertreatment follows the final drying after the pelletizing or granulating step at such brief time interval that no discernible recrystallization of the microcrystalline structure of the dry granular product occurs.

4. The process of claim 1 wherein a binding agent is added during the pelletizing or granulating step.

5. Process according to claim 1, wherein the spray dried ammonium sulfate is granulated with the addition of 5–10% by weight of water, relative to the weight of ammonium sulfate.

* * * * *